ововATION

United States Patent [19]

Stark, Sr. et al.

[11] Patent Number: 4,632,148

[45] Date of Patent: Dec. 30, 1986

[54] HYDRAULIC DISTRIBUTION VALVE

[76] Inventors: Robert G. Stark, Sr., 735 N.E. 198th St., Seattle, Wash. 98155; Tom Stark, 551 Lakeside Dr., Sedro Wooley, Wash. 98284; Robert G. Stark, Jr., 5731 S.W. Idaho, Portland, Oreg. 97221; Joseph W. Anderson, 9845 N.E. 22nd St., Bellevue, Wash. 98004

[21] Appl. No.: 773,374

[22] Filed: Sep. 5, 1985

[51] Int. Cl.$^4$ .............................................. F16K 11/02
[52] U.S. Cl. ........................ 137/624.18; 137/625.11; 137/625.21; 137/625.46; 251/175; 251/297; 251/367
[58] Field of Search ...................... 137/625.11, 625.46, 137/625.21, 624.18; 251/214, 367, 175, 176, 180, 297

[56] References Cited

U.S. PATENT DOCUMENTS

| | | | |
|---|---|---|---|
| 2,979,963 | 4/1961 | Snoy ................................ | 137/625.11 |
| 3,076,478 | 2/1963 | Winders .......................... | 137/625.11 |
| 3,348,804 | 10/1967 | Piccardo ............................ | 251/214 |
| 4,310,022 | 1/1982 | Cohen ........................ | 137/625.11 X |

FOREIGN PATENT DOCUMENTS 535424  4/1941  United Kingdom ........... 137/625.11

Primary Examiner—Alan Cohan
Attorney, Agent, or Firm—Seed and Berry

[57] ABSTRACT

A hydraulic distribution valve having two substantially identical, molded plastic shells which are joined at their peripheries to form the distribution valve housing. A shaft is journaled within the housing and extends through one of the shells. A rotor is coupled to the shaft and is rotatably disposed within a rotor chamber defined by the housing. Each shell additionally defines a plurality of axially disposed cavities, where at least two of the cavities of the second shell communicate with the rotor chamber. The second shell also defines an inlet which communicates through a gallery which passes through a portion of the shaft and rotor for communication between the inlet and a control port which is defined by the rotor. The shaft and rotor can be rotated to align the exhaust port with a selected cavity to permit communication between the inlet and the selected cavity.

16 Claims, 7 Drawing Figures

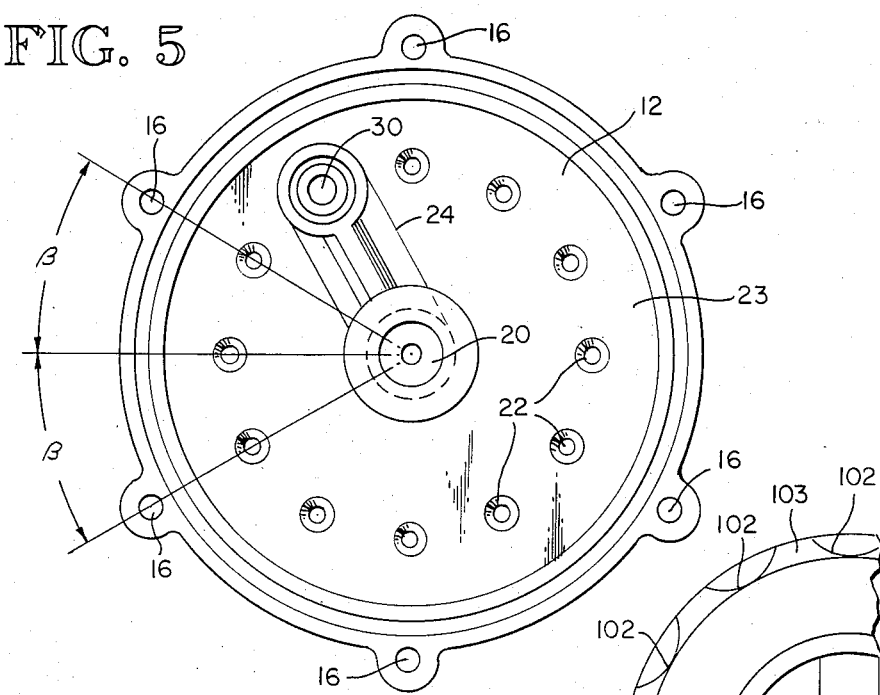
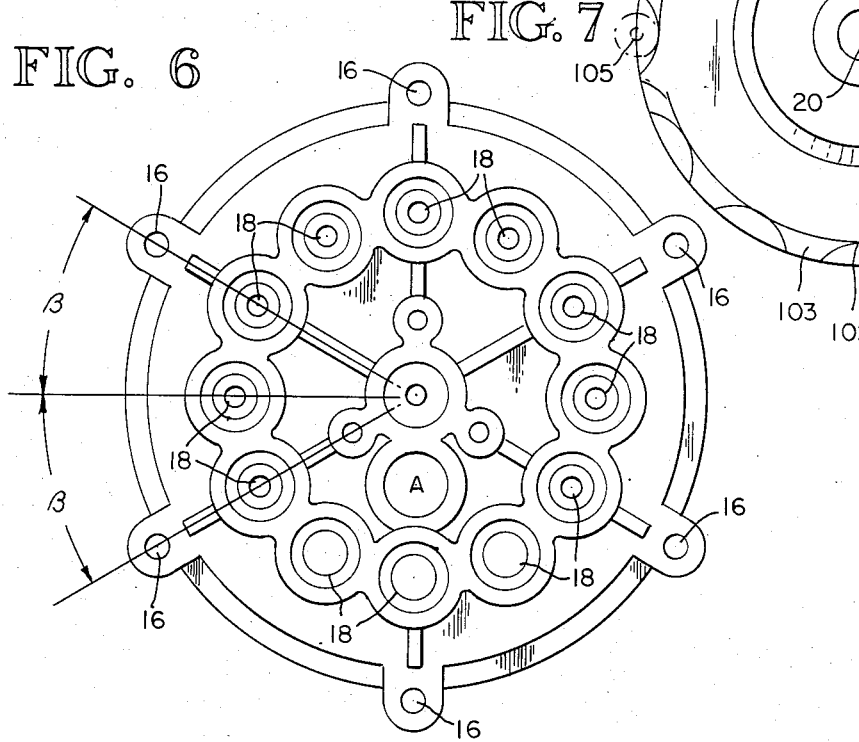

HYDRAULIC DISTRIBUTION VALVE

DESCRIPTION

Technical Field

This invention pertains to hydraulic distribution valves, and more particularly, to improvements to such valves utilized in swimming pool filtration equipment and other fluid processing apparatus.

Background Art

Swimming pool filters, water conditioners, and other apparatus where water and other liquids are continuously filtered required convenient, economical, unattended periodic backwashing of the filter medium in order to renew its efficacy. Such backwashing systems often require electrically operated valves for diverting the source of water or fluid to be filtered in a reverse direction through the filter medium. After appropriate backwashing, the normal flow of fluid through the system is resumed by appropriate actuation of electromechanical valves. In high-volume filtering and conditioning systems, multiple filters are employed which must be sequentially backwashed. This type of system requires a complex system of valves and plumbing, often utilizing multiple electromechanical valves and complex timing devices.

Other prior art systems utilize expensive distribution valve constructed from die cast, investment cast, and machined parts which are easily corroded, especially where chlorinated water or seawater is the medium to be filtered.

Disclosure of Invention

It is one of the objects of this invention, therefore, to provide a hydraulic distribution valve which is inexpensive to manufacture and resistant to corrosive fluids. It was discovered that the housing of such a distribution valve could be conveniently constructed from corrosion-resistant plastic. Moreover, the valve housing can be constructed from two identically molded plastic parts, which advantageously provide various threaded cavities which can be utilized for coupling the valve to associated plumbing or, alternatively, for cooperatively engaging bolts or other means for mounting the subject valve to related apparatus.

By utilizing a single molded part in the construction of the housing of the present invention, substantially lower costs are achieved compared to those for prior art devices. Additionally, by utilization of various plastic materials in the housing, the cost of machining precision surfaces and threads is greatly reduced compared to costs for similar operations employed in the manufacture of metallic distribution valve housings.

The improvements comprising the present invention include two substantially identical, molded plastic shells which are joined at their peripheries to form the distribution valve housing. A shaft is journaled within the housing and extends through one of the shells. A rotor is coupled to the shaft and is rotatably disposed within a rotor chamber defined by the housing. Each shell additionally defines a plurality of radially disposed cavities, where at least two of the cavities of the second shell communicate with the rotor chamber. The second shell also defines an inlet which communicates through a gallery which passes through a portion of the shaft and rotor for communication between the inlet and an exhaust port which is defined by the rotor.

The shaft and rotor can be rotated to align the exhaust port with a selected cavity to permit communication between the inlet and the selected cavity.

The cavities defined by the second shell can be selectively utilized as outlet cavities by drilling into the bottom of the selected cavity, through the housing, and into the rotor chamber. Thus, each valve can be selectively programmed for a particular application by providing a passageway between the selected cavities and the rotor chamber.

BRIEF DESCRIPTION OF THE DRAWINGS

FIG. 5 is a cross section on line 5—5 of FIG. 3 illustrating the interior of the rotor cavity;

FIG. 6 is an end view of the valve; and

FIG. 7 is a partial cross section on line 7—7 of FIG. 3 of the timing wheel of the valve constructed according to the principles of this invention.

BEST MODE FOR CARRYING OUT THE INVENTION

Figure 1:
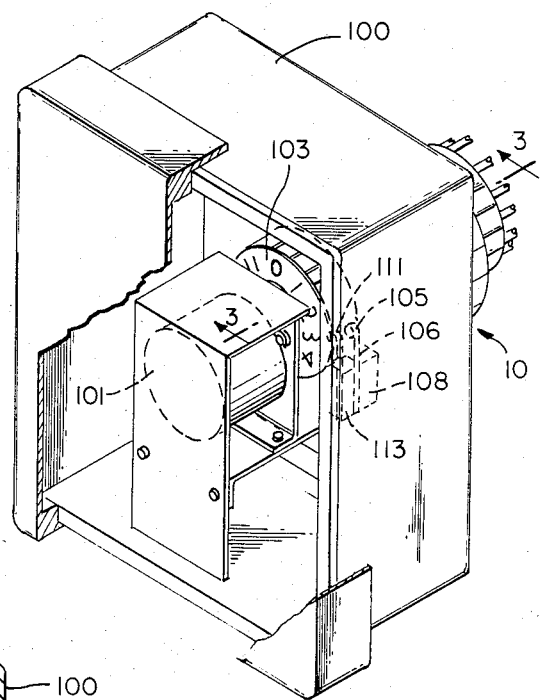
FIG. 1 is an isometric view of a hydraulic distribution valve and an associated control apparatus.
Figure 2:
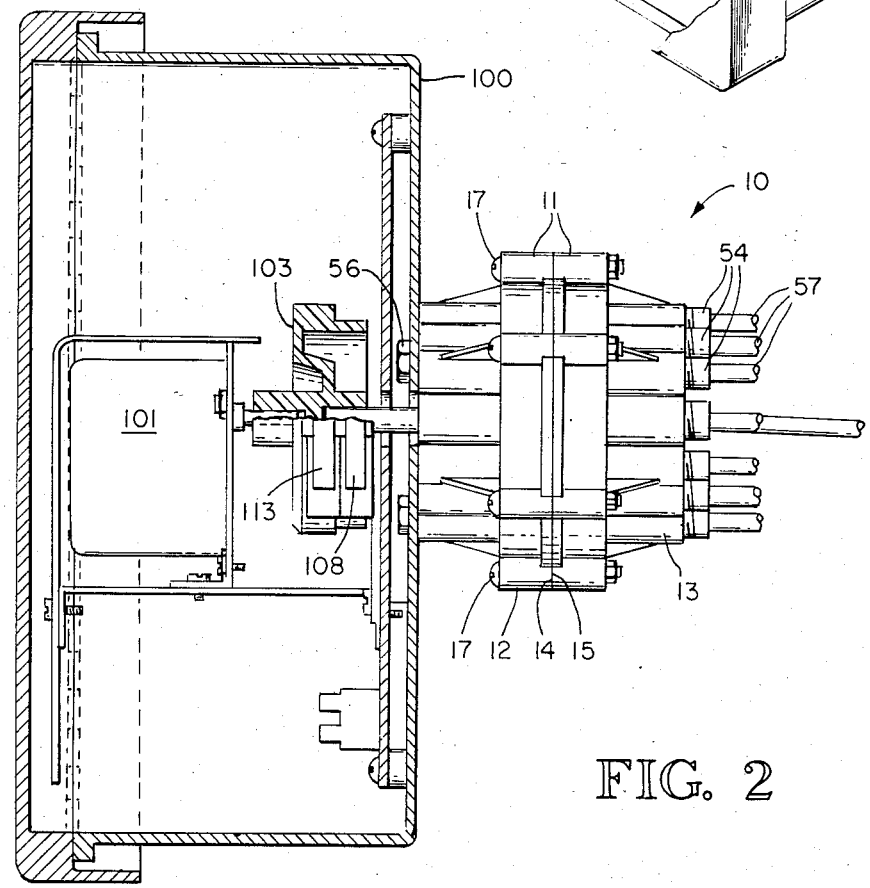
FIG. 2 is a side elevation of the invention, with a fragmentary cross section through the motor housing.
Figure 3:
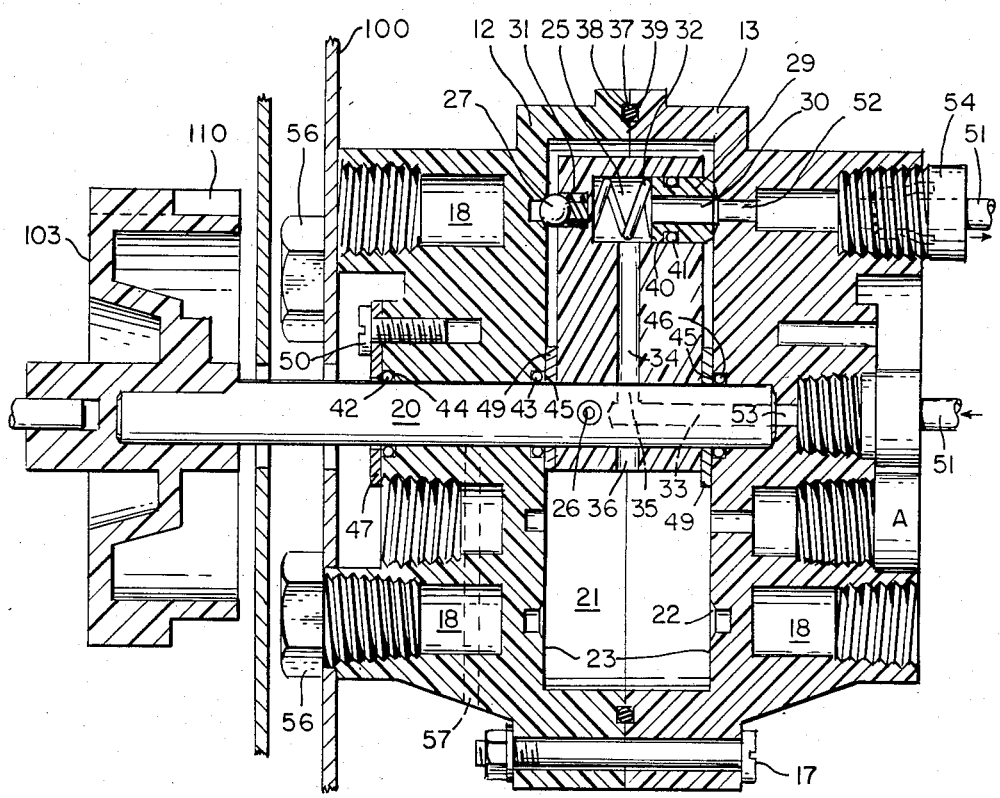
FIG. 3 is a cross section of the valve on line 3—3 of FIG. 1.
Figure 4:
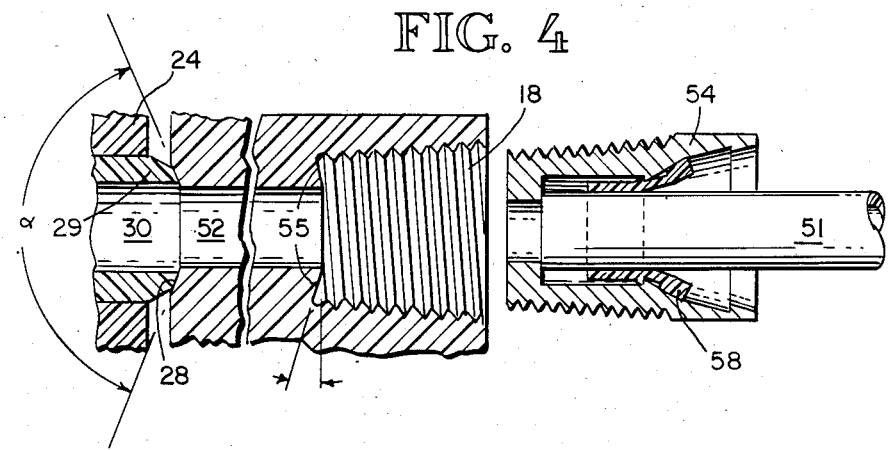
FIG. 4 is a cross section on line 4—4 of FIG. 3 illustrating the details of a typical outlet cavity.

Referring to FIGS. 1-7, a valve 10 comprises a housing 11 which has first and second substantially identical shells 12 and 13 joined at their respective peripheries 14 and 15. Preferably, these shells 12 and 13 define holes 16, through which bolts 17 or other appropriate fasteners can be utilized for convenient assembly and disassembly of the valve 10. Alternatively, the shells 12 and 13 can be adhesively bonded.

The shells are constructed from molded plastic, which may be either thermoplastic or thermosetting, depending upon the requirements of the particular application in which the valve is to be employed.

Because the first and second shells 12 and 13 are produced from the same mold, they are substantially identical. Each defines a plurality of cavities 18. The cavities are disposed radially about the center of the shell, each separated from its adjacent cavities by a uniform central angle α. Those cavities disposed within the first shell 12 are denominated "attachment cavities," while those disposed in the second shell 13 are denominated "outlet cavities."

Each shell also defines a centrally disposed inlet 19. In a manufacturing step subsequent to the molding of the first shell 12, the inlet (not shown) is drilled through the housing 11 to provide means for journaling a shaft 20. The shaft is preferably fabricated from stainless steel, brass, aluminum, plastic or other suitable noncorrosive material.

A substantially cylindrical rotor chamber 21 is defined within the housing 11. A plurality of chamfered depressions 22 are disposed within each of the sidewalls 23 of the rotor chamber 21. Each cavity 18 has an associated chamfered depression 22 which is coaxially aligned with said cavity.

A rotor 24 is press fit over the shaft 20 and rotatably disposed within the rotor chamber 21. The rotor is constructed from plastic, aluminum, or other noncorrosive material. A set screw 26 or pin is preferably employed for facilitating permanent angular orientation of the rotor 24 to the shaft 20. This press fit in the smooth molded plastic bore of the rotor seals the drilled fluid passage port 36 that goes through the rotor, avoiding expensive secondary means of closing the hole such as welding or plugging.

A cylindrical exhaust port 25 is disposed within the rotor 24, having a longitudinal axis which is spaced apart from the longitudinal axis of the shaft 20 at a distance approximately equal to the radius intersecting the center lines of the cavities 18. The rotor port 25 has an elastomer nipple 29 which is slip fit within the circular bore of the exhaust port 25. The nipple 29 has a flat sealing surface 28 to cooperatively engage a selected outlet port 22.

First and second compression springs 31 and 32 urge a detent pin or ball 27 and the nipple 29, respectively, against the sidewalls 13 of the rotor cavity 21. The chamfered depressions 22 of the first shell 12 provide detents for seating the pin 27. Due to the geometry of the housing, when the ball 27 is properly seated in a chamfered depression 22 of the first shell 12, the lumen 30 of the nipple 29 is aligned with the center line of the associated cavity 18 of the second shell 13.

A longitudinal gallery 33 is disposed in the end of the shaft 20 journaled in the second shell 13. A radial gallery 34 intercepts the longitudinal gallery 33 and is comprised of a radially disposed hole 35 which is aligned with a rotor passageway 36 which communicates with the exhaust port 25 in an area unobstructed by the nipple 29.

Rotor cavity sealing means are provided by an o-ring 37 disposed within a groove 38 and 39 defined by the peripheries of the first and second shells 12 and 13, respectively. Additional sealing means are provided by the chamfered surface 28 of the nipple 29, which is preferably constructed from rubber, plastic, or other elastomeric material sufficient to provide an adequate seal when cooperatively engaged with a chamfered depression 22. The nipple 29 also defines a groove 40 in which an o-ring 41 is seated for the purpose of sealing.

The shaft 20 has first and second o-rings 42 and 43 seated in first and second grooves 44 and 45, respectively, which are defined by each shell. A third shaft o-ring 46 is seated in the corresponding second groove 45 of the first shell 12. First, second and third washers 47, 48 and 49, respectively, are provided to retain the first, second and third o-rings 42, 43 and 46, respectively. The first washer 47 is held in position by at least one threaded fastener 50.

The second and third washers 48 and 49 also serve as thrust washers. Because the rotor 24 is fixedly attached to the shaft 20, the thrust washers 48 and 49 limit axial movement of the shaft 20.

Utilization of the described invention is accomplished by selecting those outlet cavities 18 in the second shell 13 to serve as outlet cavities. This is achieved by drilling through the closed end of a cavity 18 of the second shell 13 to provide a communication passageway 52 between the selected cavity 18 and the rotor chamber 21. A central passageway 53 provides communication between the inlet 19 and the longitudinal gallery 33 of the shaft 20. Consequently, when the shaft 20 is rotated to align the lumen 30 of the nipple 29 with the communication passageway 52 of the desired outlet 18, there exists continual communication between the inlet 19 and the selected outlet cavity 18.

In the preferred embodiment, the cavities 18 and inlet 19 are threaded to provide cooperative engagement of brass or other appropriate couplers 54 so that plumbing 51 may be suitably coupled to those outlet cavities 18 of the second shell 18 chosen to communicate with the inlet 19. Typically, one end of copper, brass, plastic pipe or tubing 51 is frictionally engaged within the interior of the coupling 54 by means of a lock washer 58 well known to the plumbing art which provides a seal between the tubing 51 and the coupling 54.

A ridge 55 is circumferentially disposed about the interior surface of each cavity 18 and the inlet 19 of each shell. The ridge 55 provides sealing means between the threaded end of the coupling 54 and the housing 11. The circumferential ridges 55 solve eternal leakage problems with the plastic ports caused by warpage of the plastic ports which cause threads to seal poorly, splitting caused by excessive fitting installation torque, and poor thread form.

The threaded cavities 18 disposed in the first shell 12 provide a convenient means for attachment of the valve 10 to associated equipment, such as a motor housing 100. Appropriate threaded fasteners 56 are selected for attachment purposes.

In case of failure of the second shaft o-ring 43, a fail-dry drain hole 57 is machined in the first shell 12 to permit communication between the exterior of the housing 11 and the shaft journal between the first and second shaft o-rings 42 and 43. This hole serves to drain any fluid which may leak around the second o-ring 43.

In an alternative preferred embodiment, means are provided for automating the rotation of the shaft 20 of the valve 10. A low-voltage AC motor 101 is attached to the motor housing 100. The motor is coupled by means of a slip clutch (not shown) to the shaft 20 of the valve 10. A disk 103 is coaxially coupled to the shaft 20 at a position between the motor 101 and the motor housing 100. The periphery of the disk 103 defines uniformly spaced, "scalloped" depressions 102 which are separated by a central angle $\alpha$ approximately equal to that angle $\alpha$ which separates the radially disposed cavities 18 of the shells 12 and 13. A cam follower 105 cooperatively engages the depressions 102 by the force provided by a spring 106. The scalloped edge of the disk also provides convenient purchase means for manually rotated the shaft 20 of the valve 10 where automated means are not required or where such means have failed and human intervention is required.

When the motor 101 is activated, the shaft 20 rotates at a predefined angular velocity. When the cam follower 105 encounters a depression 102, a switch 108 is engaged which deactivates the motor. After a preselected time, a timing circuit (not shown) reenergizes the motor 101, and the shaft 20 is then rotated the number of degrees equivalent to the central angle $\alpha$ defining the separation of the cavities 18.

By selective drilling of passageways 52, one can program the flow of fluid into the distribution valve 10 through the inlet 19 and exiting through a preselected sequence of outlet cavities 18 and associated plumbing 51.

The preferred embodiment additionally comprises means for detecting a failure in the operation of the valve 10. A lobe 110 is disposed on the outer periphery of the disk 103 in a plane parallel to that of the depression 102. A second follower 111 is urged against the disk by a spring 112 which is coupled to a switch 113.

During normal operation, the timing circuit detects one complete revolution of the disk 103 by activation of the second switch 113 by the lobe 110. If such activation does not occur within a predetermined period of time, the circuitry activates the motor 110 or, alternatively, takes other corrective measures to prevent untoward results in the filtration system.

While the details of this apparatus have been described, it should be understood that variations will be apparent to one skilled in the art without departing from the principles herein. Accordingly, the invention is not to be limited to the specific embodiments illustrated herein.

For instance, in certain applications it is anticipated that the cavities 18 disposed in the second shell 13 would function as inlets and that the "inlet" 19 would function as a common outlet. In this type of arrangement, multiple inputs could be sequentially selected to communicate with a common output. Additionally, it is anticipated that the rotor could incorporate more than one exhaust port 25, such that common communication with the inlet 19 could be accomplished simultaneously with more than one outlet cavity 18.

We claim:

1. A hydraulic distribution valve comprising:
   a housing having first and second substantially identical plastic shells joined at their peripheries;
   a shaft journaled within the housing and extending through the first shell;
   a rotor coupled to said shaft and rotatably disposed within a rotor chamber defined by the housing;
   a plurality of cavities radially disposed within each shell, at least two of said cavities of the second shell having passageways for communicating with the rotor chamber;
   an inlet defined by the second shell;
   a gallery passing through a portion of the shaft and the rotor for communication between the inlet and a control port defined by the rotor; and
   shaft rotation means for positioning the control port to permit communication between the inlet and a selected cavity passageway.

2. The valve according to claim 1, additionally comprising means for maintaining alignment of an exhaust port and selected cavity passageway.

3. The valve of claim 2 wherein the means for maintaining alignment comprises a plurality of detents radially disposed in a surface of the first shell defining a sidewall of the rotor chamber, each of said detents being coaxially aligned with a unique cavity of the second shell and a spring-loaded detent pin coupled to the rotor for engaging said detents.

4. The valve of claim 1, additionally comprising means for sealing communication from said control port to said selected cavity passageway.

5. The valve of claim 3 wherein the detent pin comprises an outer end having a chamfered seating surface which can be selectively, cooperatively engaged with a corresponding chamfered seat axially aligned with the opening to a cavity passageway in the opposite plastic second shell.

6. The valve of claim 5 wherein the chamfer has an included angle of approximately 135°.

7. The valve of claim 1 wherein the cavities of each shell are threaded, the cavities of the second shell being coupled to fluid conduits, the cavities of the first shell receiving threaded fasteners for mounting the valve on a structure.

8. The valve of claim 1, additionally comprising means for sealing the journaled shaft.

9. The valve of claim 8 wherein the sealing means comprises spaced-apart first and second elastomeric seals circumferentially disposed about the shaft and seated within the first shell, and a third elastomeric seal circumferentially disposed about the shaft and seated within the second shell.

10. The valve of claim 9, additionally comprising a drain passage defined by the first shell for communicating with the shaft between the first and second elastomeric seals and the exterior of the valve.

11. The valve of claim 1 wherein the rotor is press fit onto the shaft, the gallery passing through the rotor having a bore continuing on the opposite side of said shaft, the press fit alone sealing said bore on said opposite side of the shaft.

12. The valve of claim 1 wherein the cavities are threaded.

13. The valve of claim 12 wherein the cavities define circumferentially disposed shoulders to provide sealing means, said shoulders formed by the outer end of a smaller port at the inner end of the threaded cavities, each shoulder protruding toward the outer end of a cavity and disposed radially inward from the threads of the cavity to abut against the inner end of a coupling threaded into the cavity.

14. The valve of claim 1 wherein the shaft rotation means comprises an electric motor coupled to the shaft.

15. The valve of claim 14, additionally comprising a disk coaxially coupled to the shaft, having a plurality of peripherally disposed cam surfaces; switch means for deactivating the motor; follower means for coupling the switch means to said cam surfaces; and means for periodically activating the motor.

16. The valve of claim 1 wherein the shaft rotation means comprises a hand-operated disk coaxially coupled to the shaft.

* * * * *